United States Patent
Ott et al.

[11] Patent Number: 5,926,386
[45] Date of Patent: Jul. 20, 1999

[54] CONFIGURATION BASED COOLING FAN SPEED CONTROL

[75] Inventors: Donna E. Ott; Dennis L. Floyd; John Hoppal, all of Fort Collins; Guy R. Wagner, Loveland, all of Colo.

[73] Assignee: Hewlett-Packard Company, Palo Alto, Calif.

[21] Appl. No.: 08/595,781

[22] Filed: Feb. 2, 1996

[51] Int. Cl.⁶ .................................................. G05B 19/00
[52] U.S. Cl. .............. 364/175; 364/528.12; 364/528.13; 318/471; 318/472; 388/907.5
[58] Field of Search .................................. 364/175, 147, 364/153, 166, 174, 191, 480, 481, 550, 551.01, 557, 565, 707, 528.12, 528.13, 528.35, 528.39; 361/678, 687–690, 694, 695, 712; 395/750, 908, 916; 318/471, 472, 268–270; 388/903, 904, 907, 907.5, 909, 923, 933, 934, 809, 810; 123/41.49; 236/DIG. 9, 35, 49.3; 340/825.06, 825.22; 702/145, 148

[56] References Cited

U.S. PATENT DOCUMENTS

| | | | |
|---|---|---|---|
| 4,856,078 | 8/1989 | Konopha | 388/934 |
| 5,072,356 | 12/1991 | Watt et al. | 364/147 |
| 5,249,741 | 10/1993 | Bistline et al. | 236/49.3 |
| 5,363,024 | 11/1994 | Hiratsuha et al. | 318/472 |
| 5,526,289 | 6/1996 | Dinh et al. | 364/557 |
| 5,528,229 | 6/1996 | Mehta | 340/825.06 |
| 5,568,641 | 10/1996 | Nelson et al. | 395/750 |
| 5,627,527 | 5/1997 | Mehta | 340/825.06 |
| 5,631,852 | 5/1997 | Chen | 364/557 |

Primary Examiner—James P. Trammell
Assistant Examiner—Hal D. Wachsman

[57] ABSTRACT

A configuration based cooling fan speed controller for use with computers and other heat intensive electronic devices. Methods of using and manufacturing the controller are also disclosed. The cooling fan speed controller generally comprises a EEPROM coupled with firmware controls. If the controller is set in manual mode, a speed input by the computer's manufacturer or service provider is used to set the starting speeds of a device's cooling fans. If the controller is set in auto mode, the device's configuration is detected, and cooling fan start speeds are retrieved from a fan speed table stored in the EEPROM. Once the lowest operating speeds for a device's cooling fans have been selected, the speeds of the device's cooling fans are ramped up or down in response to the temperature sensed by an ambient air temperature sensor. The invention holds audible fan noise to a minimum. The invention also gives a manufacturer the ability to write an appropriate fan speed table into a controller's EEPROM at any stage in the manufacturing process. A single fan type may therefore be placed in a variety of electronic devices, and programmed for a variety of uses.

14 Claims, 8 Drawing Sheets

CONFIGURATION BASED COOLING FAN SPEED CONTROL

BACKGROUND OF THE INVENTION

The invention pertains to a configuration based cooling fan speed control, and more particularly, to a method and apparatus for controlling an electronic device's cooling fan speed using a programmable EEPROM which is writable through limited access firmware controls.

As electronics enter the submicron age, smaller, more closely packed conductors are performing more operations at higher speeds. One byproduct of this technological advancement is heat. Heat is typically removed with the assistance of one or more cooling fans mounted in close proximity to a device's heat producing components. However, while conductor technology has advanced significantly, fan technology has not.

Most conventional fans are run at a constant voltage. The fans and their operating voltages are chosen so that adequate airflow/cooling is guaranteed for a device's worst case configuration and ambient conditions. For most configurations and ambient conditions, this means providing more airflow, and thus more audible noise, than is needed. For a device requiring relatively large cooling fans, this noise can reach a bothersome level.

Some fans provide a means of ramping up fan speed based on changes in ambient conditions (i.e., air temperature). However, the fans are still configured so as to always assume a worst case of operating conditions. Thus, a fan's thermal ramp begins at a relatively high speed, and the airflow and acoustic noise produced by the fan are still significantly greater than are required.

It is therefore a primary object of this invention to provide a cooling fan speed controller which is capable of adjusting a fan's settings for a wide range of product configurations.

It is also an object of this invention to provide a cooling fan speed controller which relies on programmable firmware controls.

It is a further object of this invention to provide a fan which minimizes acoustic noise emissions.

SUMMARY OF THE INVENTION

In the achievement of the foregoing objects, the inventors have devised a configuration based cooling fan speed controller for use with computers and other heat intensive electronic devices. The cooling fan speed controller generally comprises a EEPROM coupled with firmware controls. If the controller is set in manual mode, a speed input by the computer's manufacturer or service provider is used to set the desired starting speeds of the device's cooling fans. If the controller is set in auto mode, the device's configuration is first detected using the firmware controls, and then a cooling fan's lower speed limit is retrieved from a fan speed table stored in the EEPROM. Once the lower speed limits of a device's cooling fans have been selected, its cooling fan speeds are ramped up or down in response to the temperature sensed by an ambient air temperature sensor.

The above invention holds audible fan noise to a minimum. It also gives a manufacturer flexibility in choosing an appropriate fan for a heat intensive device. A single fan type may be placed in a variety of devices, and then programmed through a write of the appropriate EEPROM fan speed table. This results in speedier manufacturing and decreased manufacturing costs.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawing in which.

DESCRIPTION OF THE PREFERRED EMBODIMENT

Figure 1:
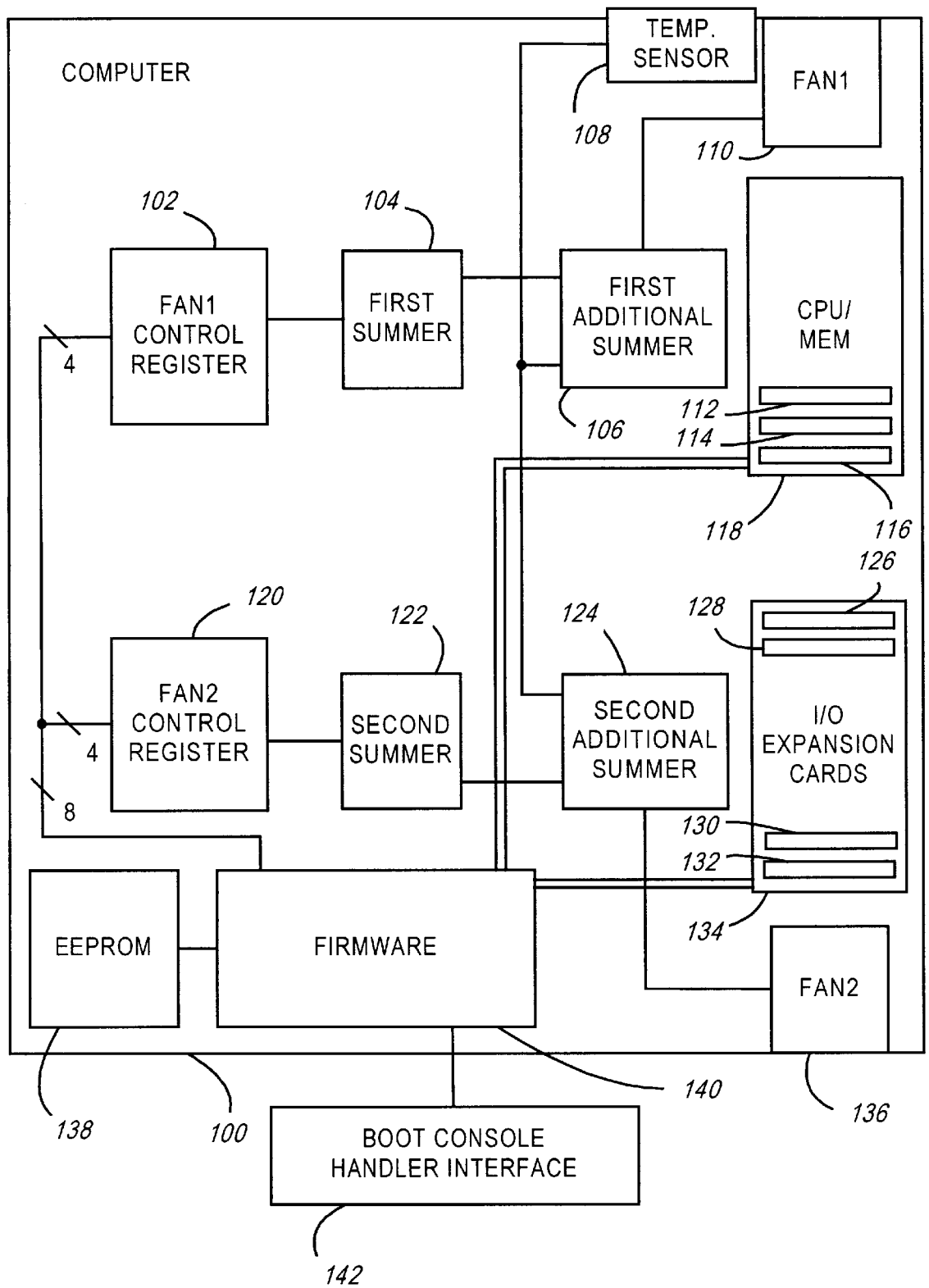
FIG. 1 is a schematic illustrating a fan speed control circuit.
Figure 3:
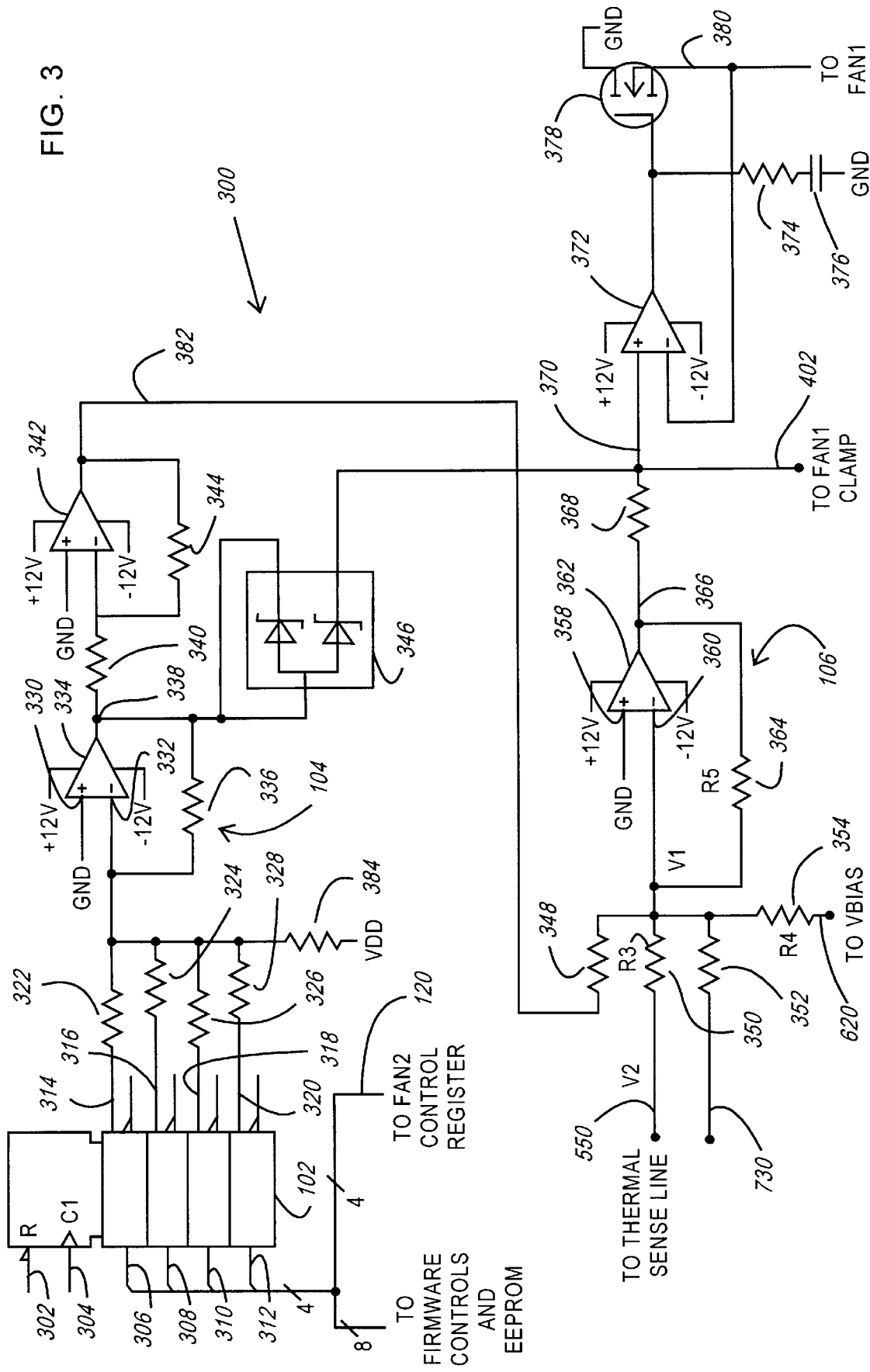
FIG. 3 is a schematic illustrating a hardware implementation of a fan control register, summers, amplifier, and buffer used in the fan speed control circuit of FIG. 1.
Figure 9:
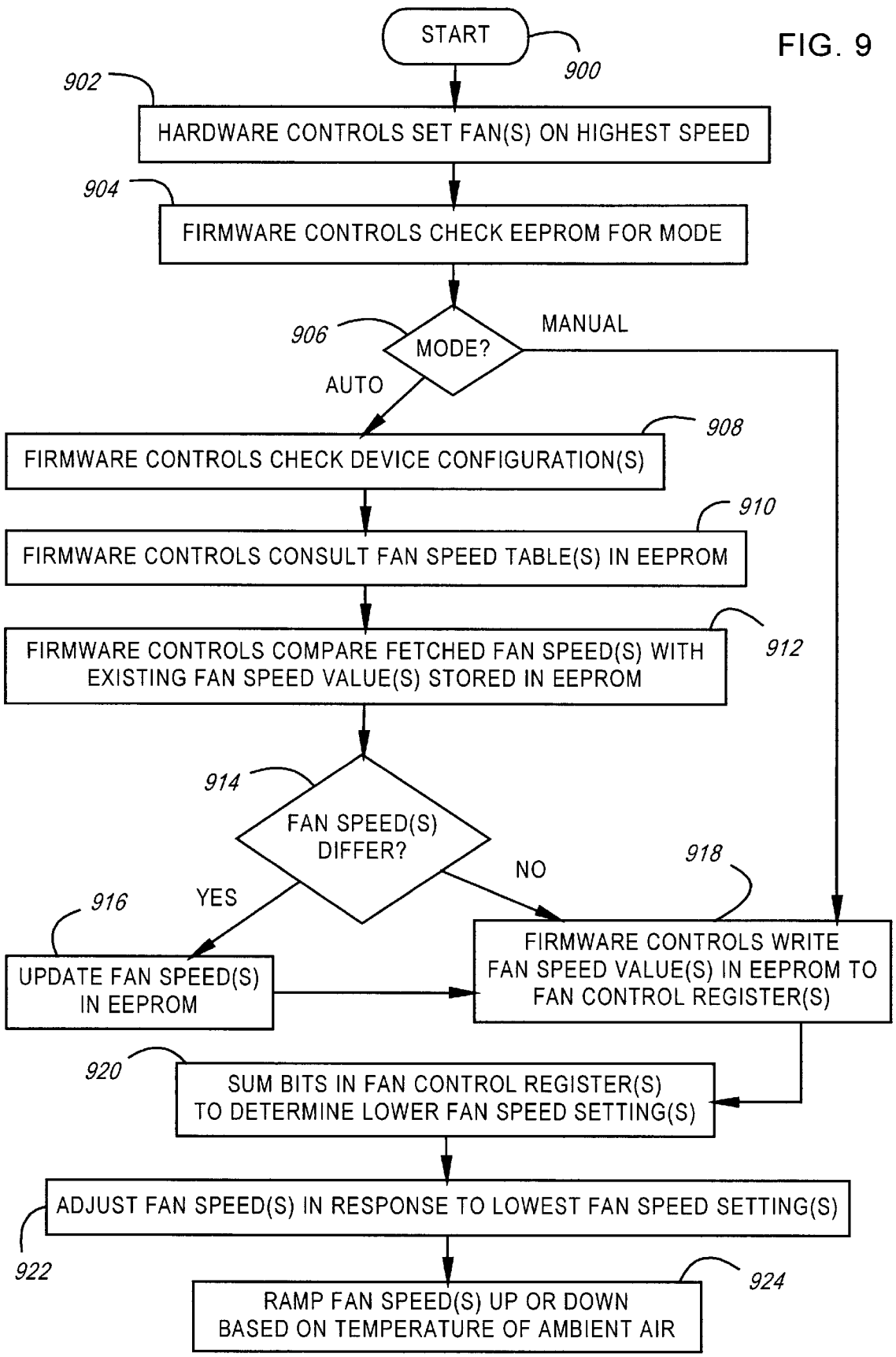
FIG. 9 is a flow chart illustrating a method of using firmware to control a cooling fan's speed.
Figure 10:
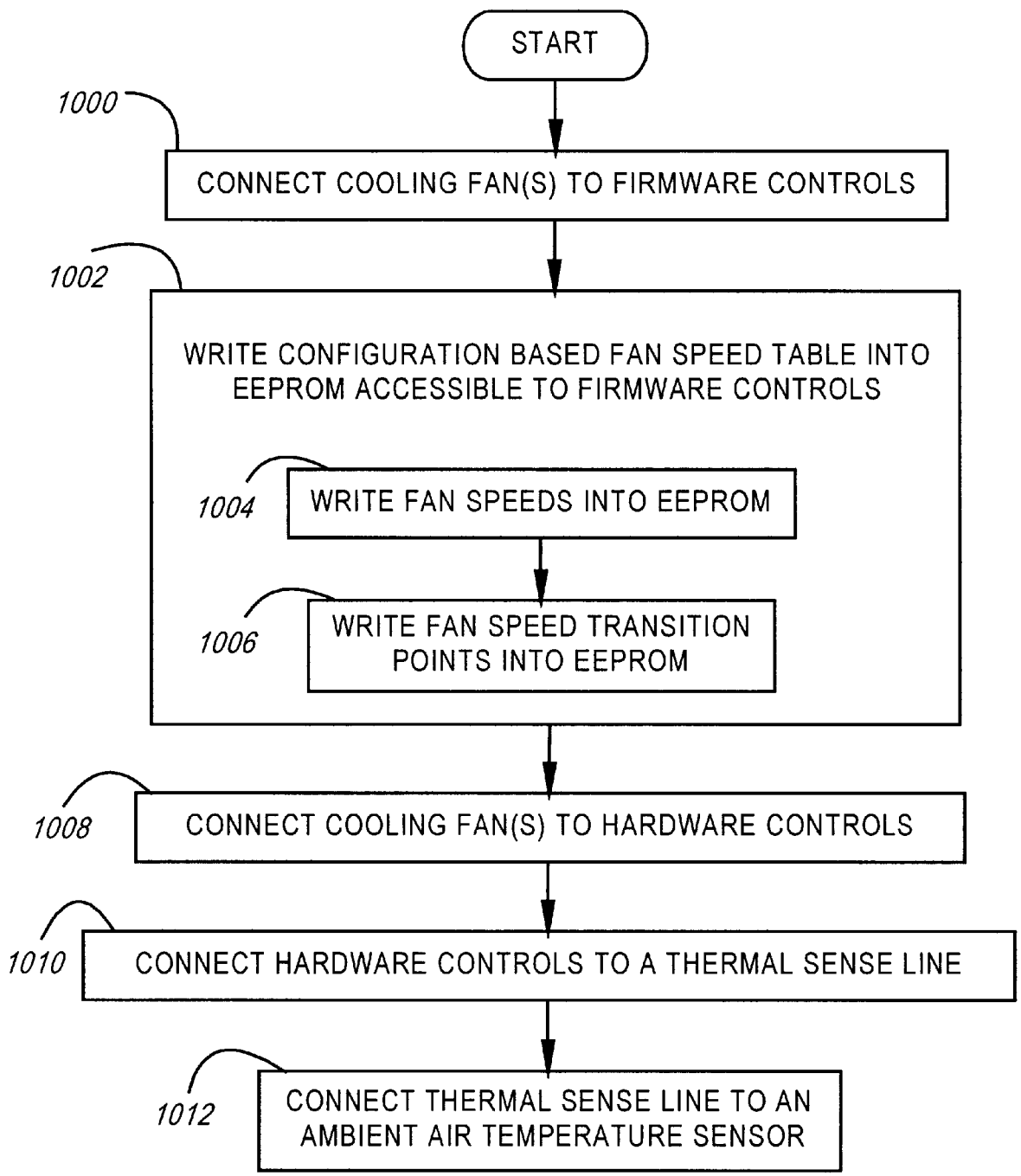
FIG. 10 is a flow chart illustrating a method of manufacturing electronic devices having a cooling fan associated therewith.

The invention relates generally to configuration based cooling fan speed control. A cooling fan speed controller is illustrated in FIGS. 1 and 3, which may generally comprise a EEPROM 138 coupled with firmware controls 140. A method of using firmware 140 to control a cooling fan's speed is illustrated in FIG. 9 The method generally comprises the step of selectively setting the cooling fan's lowest speed 918 using firmware controls 140. A method of manufacturing electronic devices 100 (FIG. 1) having a cooling fan 110 associated therewith is illustrated in FIG. 10. The method generally comprises the step of connecting the cooling fan 110 to firmware controls 140.

Having thus described configuration based cooling fan speed control in general, the above apparatus and methods will now be described in further detail.

Many electronic devices are associated with one or more cooling fans. FIG. 1 shows a computer 100 having two such cooling fans 110, 136. One of the fans 110 (FAN1) is mounted in close proximity to the computer's microprocessor and memory modules 118 (CPU/MEM) so as to force air across these components and prevent them from overheating. Another fan 136 (FAN2) is mounted in close proximity to the computer's input/output and/or expansion cards 134 (I/O EXPANSION CARDS) so as to cool these additional components.

As is well known in the art, computers and similar electronic devices are often upgradable. Thus, one or more memory modules 112, 114, 116 may be plugged into a memory board to increase a computer's available memory. Likewise, one or more expansion cards 126, 128, 130, 132 may be plugged into expansion slots to add better graphics capabilities, sound, an alternate media drive or the like. As a result, the fans 110, 136 mounted within a computer 110 or other upgradable electronic device must be designed so as to adequately cool any combination of components 112–116, 126–132 which may be mounted within the device 100.

The cooling fan speed controller shown within the computer 100 of FIG. 1 is designed to independently vary the voltage applied to each of the computer's cooling fans 110, 136. Voltage is varied in response to a sensed temperature, as is illustrated in the thermal ramp curves 800, 802, 804 of FIG. 8. As the sensed temperature increases beyond a given threshold 812, the voltage applied to each fan 110, 136 is increased, and consequently, the speed of each fan 110, 136 is increased. Likewise, a decrease in the sensed temperature will result in a decrease in fan speed. Hardware controls 102–106, 120–124 are used to set both the slope and upper limit 814 of each fan's thermal ramp 800, 802, 804 to a fixed value, while firmware controls 140 are used to set the lower limit 806, 808, 810 of each fan's thermal ramp 800, 802, 804. By 1) programmatically setting each fan's lower speed limit 806, 808, 810 based upon the configuration of components it is to cool, and 2) ramping fan speeds up or down in response to a sensed temperature, audible fan noise and power consumption may be held to a minimum.

As stated above, a preferred embodiment of the cooling fan speed controller is designed to independently control the speeds of two cooling fans 110, 136 mounted in close proximity to heat producing components 118, 134 of a computer 100 (as shown in FIG. 1). A single fan control register 102, 120 (FAN1 CONTROL REGISTER and FAN2 CONTROL REGISTER) corresponds to each of the computer's cooling fans 110, 136. A summer 104, 122 (FIRST SUMMER and SECOND SUMMER) and additional summer 106, 124 (FIRST ADDITIONAL SUMMER and SECOND ADDITIONAL SUMMER) are connected between each corresponding fan 110, 136 and fan control register 102, 120. Each additional summer 106, 124 has an input for a thermal sense line derived from a single ambient air temperature sensor 108 (TEMP. SENSOR). The above circuitry will be collectively referred to as hardware controls 102–106, 120–124.

A lower speed limit 806, 808, 810 (FIG. 8) for each cooling fan 110, 136 may be written to the fan control registers 102, 120 via firmware controls 140. The firmware controls 140 have access to various information stored in a EEPROM 138 (Electrically Erasable Programmable Read Only Memory). A computer manufacturer or service technician may interact with the firmware controls 140 through a boot console handler interface 142.

Figure 8:
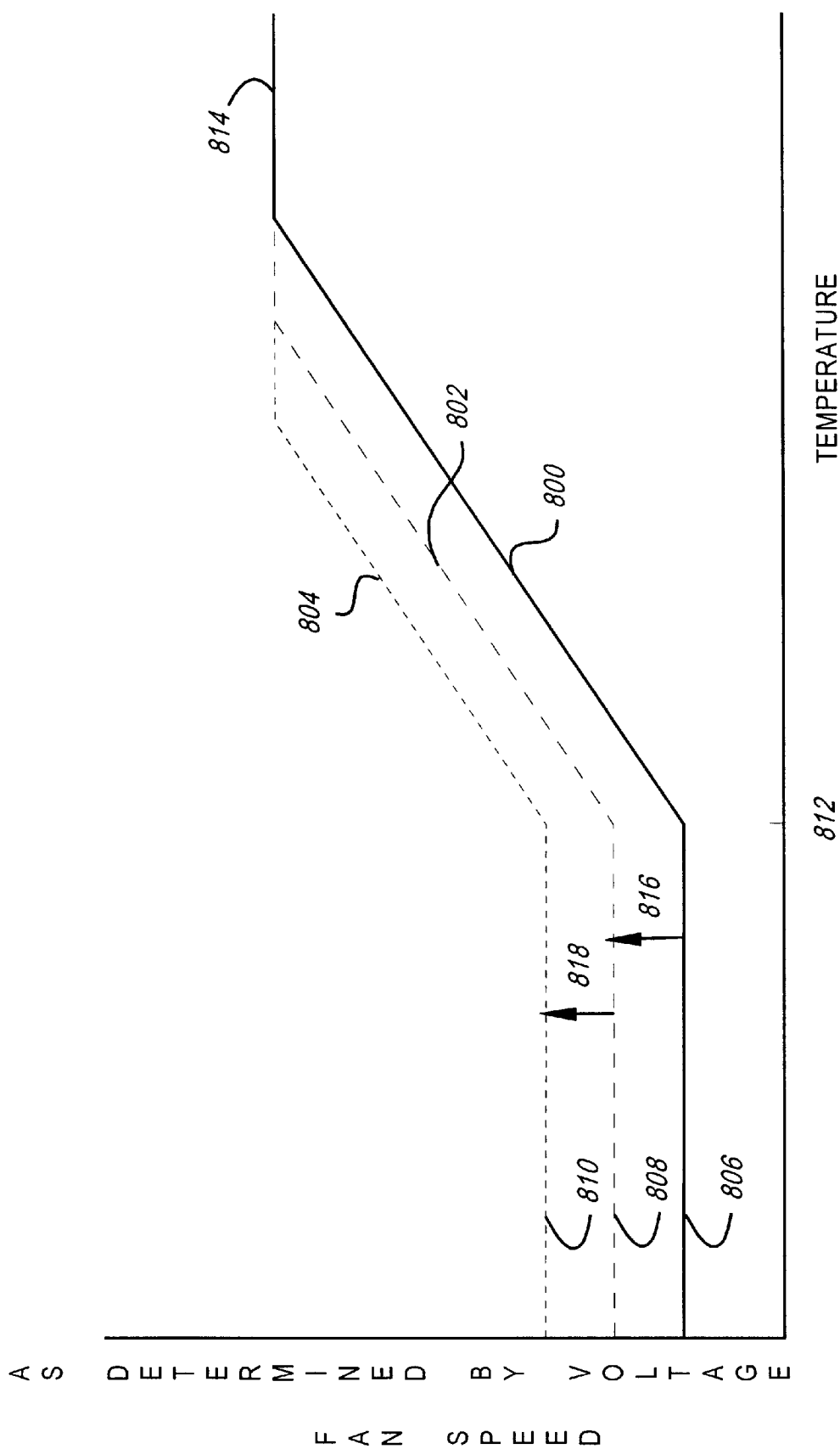
FIG. 8 is a graph illustrating various thermal ramps.

Operation of the cooling fan speed controller is best understood with reference to the method charted in FIG. 9. When the computer 100 is turned on 900, the fan control registers 102, 120 are cleared (i.e., all bits are set to zero). The summers 104, 122 connected to the fan control registers 102, 120 are active negative. Thus, a zero in a bit position of a fan control register 102, 120 will result in an increase in voltage produced by one of the summers 104, 122. When all of the bits of a fan control register 102, 120 are cleared, the fan 110, 136 corresponding with that register will be set 902 to its highest speed 814 (FIG. 8).

Momentarily after the computer 100 is turned on 900, the computer 100 will begin its boot procedure. During boot, the firmware controls 140 consult 904 a stored bit in the EEPROM 138 to determine 906 what mode of fan control is being used. The possible modes are auto and manual. In auto mode, the firmware controls 140 first launch a routine to check 908 the configuration of both the CPU/MEM 118 and I/O EXPANSION CARDS 134. Configuration checking routines are known to those skilled in the art and will not be discussed in great detail, as many configuration checking routines are vendor and/or hardware specific. An example of a configuration checking routine would be the conducting of a BUS walk to determine the number of memory modules 112, 114, 118 and/or expansion cards 126, 128, 130, 132 plugged into the memory boards and expansion slots of a computer 100. With this information, the number of modules 112–118 or cards 126–132 present could be summed to obtain a configuration based number. For more precise control of cooling fan speeds, expansion card "types" could also be detected. Heat intensive cards could thus be assigned weighted configuration values so that a computer 100 having a single heat intensive expansion card would be equated with a computer having three expansion cards producing average heat.

While continuing in auto mode, the firmware controls 140 next consult 910 a fan speed table stored in the EEPROM 138. The fan speed table can be formatted in a variety of ways. For example, a fan speed table can comprise configurations and corresponding fan speeds (e.g., 1 expansion card=fan speed A, 2 expansion cards =fan speed B, etc.). A fan speed table can also comprise configurations and corresponding increases in fan speeds (e.g., 1 expansion card=fan speed A, 2 expansion cards=fan speed A+B, etc.). However, the fan speed table preferably comprises fan speeds and corresponding transition points (e.g., up to 2 expansion cards=fan speed A, up to 7 expansion cards=fan speed B, etc.). The fan speed table, including fan speeds and transition points, can be stored in a one-word register within the EEPROM 138. Thus, in a 32-bit machine, four bits could be assigned to represent a transition point, the next four bits a fan speed, the following four bits a transition point, and so on. To give additional independent control over two or more fans 110, 136, firmware controls 140 can be programmed to consult a separate fan speed table in EEPROM 138 for each fan 110, 136 to be controlled.

The fan speeds retrieved from the fan speed table are used to set the lower speed limit 806, 808 (or lower voltage limit) of each fan 110, 136. The lower speed limits 806, 808 are written into fan speed register(s) located within the EEPROM 138. Preferably, only one fan speed register exists in the EEPROM 138 (e.g., two four-bit fan speeds can be stored in a single eight-bit fan speed register).

It is well known that EEPROMs 138 may only be written a finite number of times. To avoid unnecessary writes to (and early failure of) a EEPROM 138, firmware controls 140 may compare 912, 914 the fan speeds retrieved from the fan speed table with the fan speeds stored in the fan speed register. If the values agree, the fan speed register is not rewritten. If the values disagree, new values are written 916 into the EEPROM fan speed register. A fan speed retrieved from a fan speed table should only disagree with a value stored in the fan speed register after a computer upgrade or downgrade. Since computers are rarely upgraded more than a few times, it is believed that EEPROM 138 failure is an unlikely event.

After detecting 908 the computer's configuration, and verifying 910, 912, 914 the lower fan speed limits 806, 808 stored in the fan speed register of the EEPROM 138, the values stored in the fan speed register are written 918 into hardware implemented fan control registers 102, 120 (one for each cooling fan 110, 136). If firmware controls 140 initially detect that the fan speed controller is running in manual mode, fan speed values are immediately retrieved from the fan speed register in EEPROM 138 and written to the fan control registers 102, 120.

Figure 2:
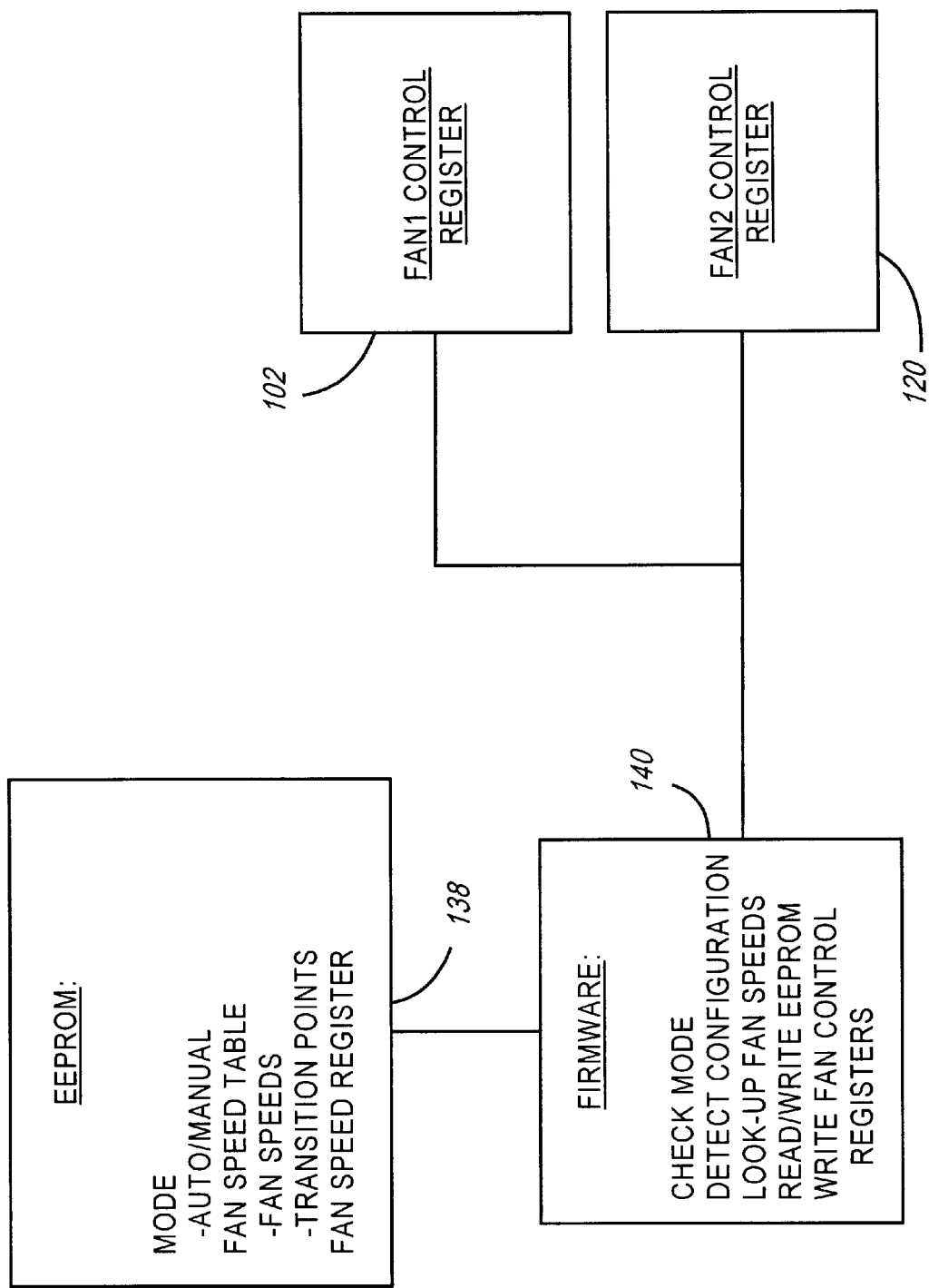
FIG. 2 is a diagram illustrating the functional dependencies of components of the fan speed control circuit of FIG. 1.

The relationships and functions of the EEPROM 138, firmware controls 140, and fan control registers 102, 120 are set forth in FIG. 2.

The fan speed table described above represents an important advancement over conventional cooling fan speed controllers. During the design and manufacturing of a computer 100, final configuration and temperature data may not be known until late in the computer's development cycle. With the above method and apparatus, computers may be manufactured with universal cooling fans. At any time during the manufacturing process, the EEPROM fan speed tables may be quickly and easily rewritten to reflect changes in data. This procedure reduces manufacturing costs, and decreases product "time to market".

A fan speed table is also helpful in situations where a device, such as a computer, may leave the factory in a variety of configurations. For example, computers based on a common microprocessor may be shipped from the factory as low-end, multimedia, and professional high-end machines. Each of these computers has a different configuration, and thus different cooling requirements. However, when each of these computers is equipped with a programmable cooling fan speed controller (a EEPROM 138 with a stored fan speed table and firmware controls 140), like fans may be mounted in each of the computers, and their speeds can be automatically adjusted during boot routines. Again, this results in lower manufacturing costs.

It is also significant that the fan speed table is stored in EEPROM 138, as this allows the fan speed values to be adjusted by merely changing the contents of the EEPROM 138, rather than by performing a complete code recompile and rebuild followed by a reflash of the boot ROM (Read Only Memory). One can appreciate that use of a EEPROM 138 results in significant speed savings.

Once fan speed values have been written into the fan control registers 102, 120, control of the cooling fans 110, 136 shifts from firmware 140 to hardware 102–106, 120–124. However, before describing the hardware controls 102–106, 120–124, it is important to discuss the boot console handler interface 142. The boot console handler interface 142 is the means through which a manufacturer or service technician accesses the firmware controls 140. Through the interface 142, one may place the fan speed controller in either auto or manual mode. If manual mode is selected, the user is prompted for the lower fan speed setting 806, 808 for each cooling fan 110, 136. Once input, the manually selected fan speed will disable the firmware control routines responsible for configuration checking 908 and fan speed table lookup 910. The fan speed controller will remain in manual mode until an authorized technician again accesses the firmware controls 140, through the boot console handler interface 142, and places the controller in auto mode.

A preferred hardware embodiment of the aforementioned hardware controls 300, comprising a fan control register 102, summer 104, and additional summer 106, is shown in FIG. 3.

Figure 4:
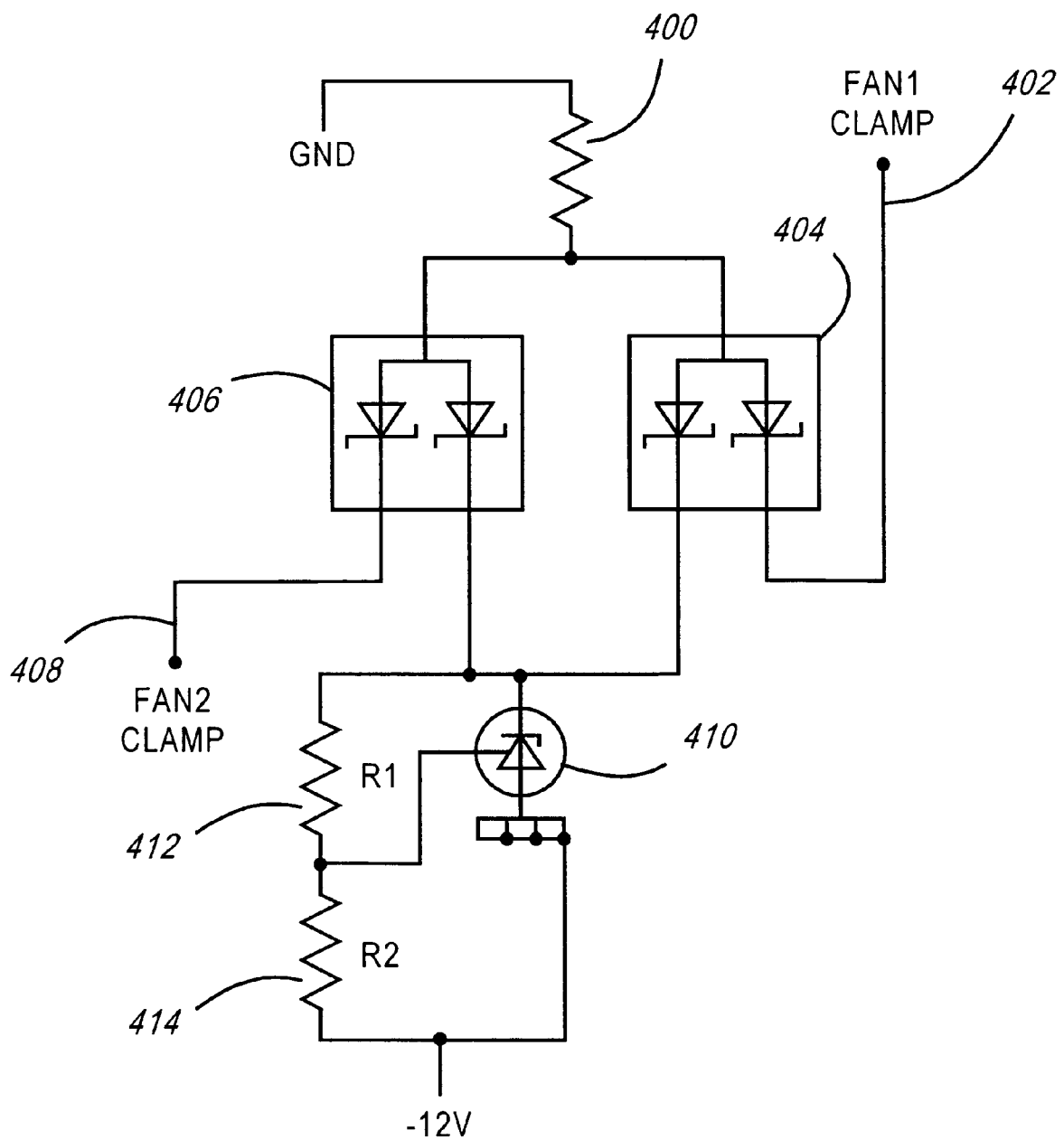
FIG. 4 is a schematic illustrating a minimum voltage clamp used in the fan speed control circuit of FIG. 1.

The hardware controls 300 include a minimum voltage clamp (FIG. 4) which is designed to clamp the "absolute minimum" voltage (806 in FIG. 8) supplied to the cooling fans 110, 136 at a predetermined minimum voltage. The clamp comprises one or more zener diode blocks 404, 406 (one for each fan 110, 136 to be clamped) connected in parallel between a resistor 400 tied to ground and a TL431 410. The minimum voltage 806 will most likely be based on the minimum voltage needed to operate one of the cooling fans 110 (probably about 6 volts for a 12 volt fan). The minimum voltage 806 is set by adjusting the values of two biasing resistors, R1 412 and R2 414, connected to the TL431 410 in FIG. 4. The minimum voltage 806 is set by the ratio of $[(R1+R2)/R2]*[2.5 \text{ Volts}]$. The circuit of FIG. 4 provides clamps 402, 408 for each of the fans 110, 136 shown in FIG. 1.

The upper set point 814 of a fan's thermal ramp curve is of course determined by the supply voltage (12 volts in the preferred embodiment).

As earlier stated, the fan speed values stored in the EEPROM fan speed register are written to one or more fan control registers 102, 120. FIG. 3 illustrates the case wherein two four-bit fan speeds stored in an eight-bit EEPROM fan speed register are transferred to two fan control registers 102, 120, one of which is shown in its entirety. Each fan control register 102, 120 comprises four digital inputs 306–312 for the bits of a fan speed value, a clock input 304, a reset input 302, and four digital outputs 314–320. The reset input 302 is used to zero the bits of the register 102 at startup. The fan control registers 102, 120 are active negative. This means that a "logic 0" input produces a voltage at the output, while a "logic 1" input does not. Each output 314–320 is connected via a resistor 322–328 to the negative input 332 of a summer 104. The summer 104 comprises a powered op-amp 334 (operational amplifier) having its positive input 330 tied to ground. Feedback exists through a resistor 336 connected between the op-amp's output 338 and negative input 332. Besides summing, the summer operates as a digital-to-analog converter.

The resistors 322–328 connected between the negative input 332 of the summer 104 and the fan control register 102 are chosen in multiples of one another such that a zero received at the least significant bit position 312 of the fan control register 102 contributes an approximately 0.31 volt increase to the output 338 of the summer 104. A zero received at the next less significant bit 310 contributes approximately 0.62 volts, and so on. Since off the shelf resistors do not come in precise multiples of one another, some variation in the distance between settings may exist. However, with such an incrementation, sixteen initial fan speed settings are available between six and eleven volts. In such a configuration, an additional resistor 330 may be connected between power (+5V) and the negative input 332 of the summer 104 to change the range of initial fan speed settings (voltages) from between 6 and 11 volts to between 7 and 12 volts. In addition to fixing the lower set point 806, 808, 810 of a fan's thermal ramp 800, 802, 804, the weighted resistance values 322–328 connected to the fan control register 102 add a positive DC offset 816, 818 to a fan's thermal ramp (FIG. 8).

To increase the gradation of the fan settings, the resistor values 322–328 associated with the fan control register outputs 314–320 may be increased. This will, however, decrease the range of the settings. For example, doubling the resistor values 322–328 would yield an approximate 0.161 volt gradation over a range of approximately 8.6 to 11 volts (9.6 to 12 volts with the affect of the additional resistor 330 tied to power).

The output 338 of the first summer 104 is amplified using an amplifier comprising an op-amp 342, an input resistor 340, and a feedback resistor 344. The amplified sum 382 is then input to the negative input 360 of an additional summer 106 via a resistor 348. Also connected to the negative input 360 of the additional summer 106 is a thermal sense line 550 (via another resistor 350), a biasing voltage (VBIAS 620, connected via an additional resistor 354), and a power compensating voltage 730 (via yet another resistor 352). The additional summer 106 comprises another powered op-amp 362 having a grounded positive input 358, and a resistive negative feedback path 364.

Figure 5:
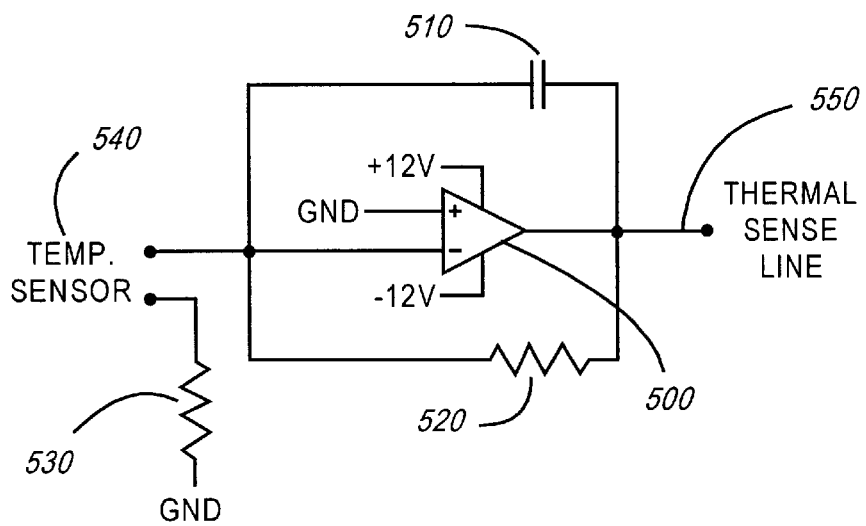
FIG. 5 is a schematic illustrating a thermal sense line derived from an ambient air temperature sensor.

The rate of voltage increase along a fan's thermal ramp 800, 802, 804 is changed by increasing or decreasing the value of the resistor 350 connected between the additional summer 106 and the thermal sense line 550. The rate of increase can also be changed by adjusting the gain of the thermal sense line's amplifier. See FIG. 5. The thermal sense line amplifier comprises a powered op-amp 500 having a grounded positive input, and a resistive 520 and capacitive 510 negative feedback path. An ambient air temperature sensor 540 (108 in FIG. 1) is connected between the negative input of the op-amp 500 and a resistive ground connection 530. Increasing the resistance value 350 decreases the slope, decreasing the resistance value 350 increases the slope.

If the slope of a thermal ramp is changed, the value of the resistance 354 attached to the additional summer's 106 VBIAS input 620 must also be changed in order to keep the ramp's lower break point 812 constant (e.g., a desired lower break point at 30° Celsius). The voltage added to the additional summer's output 366 by the VBIAS input 620 should be (−V1 at 30° Celsius)*R3. It can be changed by adjusting the value of the resistance 354 tied to the additional summer's negative input 360. The contribution is (R5/R4)*V2.

Figure 6:
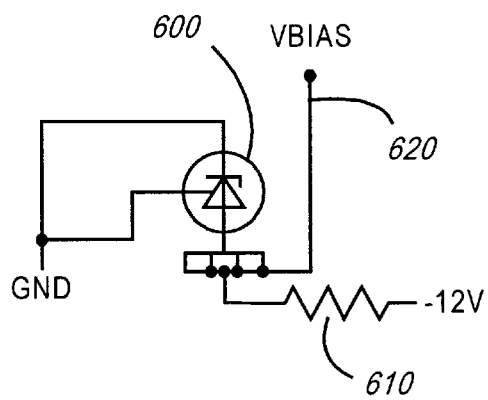
FIG. 6 is a schematic illustrating a power supply compensation device used in conjunction with the control circuit of FIG. 1.
Figure 7:
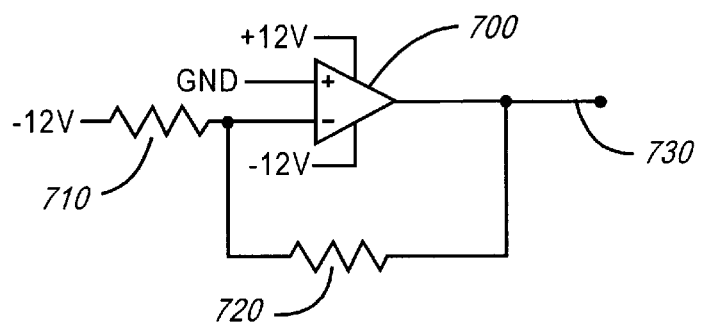
FIG. 7 is a schematic illustrating an additional power supply compensation device used in conjunction with the control circuit of FIG. 1.

Variations in the −12V power supply voltage are addressed through two devices. First, a VBIAS 620 (FIGS. 3 and 6) is generated with reference to ground rather than the −12V supply to be used as constant negative DC voltages. (These voltages are used to subtract the contribution due to the temperature sensor at 30 degrees Celsius.) The VBIAS is generated using a TL431 600 and resistor 610 connected as shown in FIG. 6. Secondly, an inverted value of the difference between the power supply and ground 730, generated using the op-amp 700 and resistors 710, 720 of FIG. 7, is added into the fan supply voltage 380. As long as the overall gain of this input 730 to the additional summer 106 is unity, any variations in the power supply voltage will be subtracted out.

The output 366 of the additional summer 106 is routed through a resistor 368 into the positive input 370 of a buffer comprising an op-amp 372 and other components 374, 376, 378, as shown in FIG. 3. Note that the minimum voltage clamp 402 is also tied to the positive input 370 of the buffer. A fan supply voltage 380 (in FIG. 3, the supply voltage 380 is for FAN1 110) is taken from the output of the buffer.

The hardware control circuitry 300 of FIG. 3 would be repeated for each fan 110, 136 to be controlled (twice for the controller of FIG. 1).

FIG. 10 illustrates a method of manufacturing a device having one or more cooling fans wherein the fans are controlled using the apparatus and method described above. The method begins with the connection 1000 of one or more cooling fans (110, 136 in FIG. 1) to firmware controls 140. Next, a configuration based fan speed table is written 1002 into a EEPROM 138 which is accessible to the firmware controls 140. Writing the table 1002 includes the steps of writing fan speeds 1004 and fan speed transition points 1006 into the EEPROM. The cooling fans 110, 136 are also connected 1008 to hardware controls 102–106, 120–124, which in turn are connected 1010 to a thermal sense line. The thermal sense line may be connected to an ambient air temperature sensor 108.

While illustrative and presently preferred embodiments of the invention have been described in detail herein, it is to be understood that the inventive concepts may be otherwise variously embodied and employed and that the appended claims are intended to be construed to include such variations except insofar as limited by the prior art. For example, those experienced in the art may readily apply the principles and techniques disclosed above to build cooling fan speed controllers capable of controlling from one to many cooling fans.

What is claimed is:

1. A cooling fan speed controller comprising:
    a) a EEPROM;
    b) firmware controls, said firmware controls being coupled with the EEPROM to provide a means for selectively setting a cooling fan's lowest speed;
    c) a fan control register;
    d) a plurality of summers, said plurality of summers being coupled with said fan control register to comprise a set of hardware controls for a cooling fan, said hardware controls being coupled with said firmware controls.

2. A cooling fan speed controller as in claim 1, wherein the EEPROM stores a configuration based fan speed table having fan speeds and fan speed transition points written therein.

3. A cooling fan speed controller as in claim 1, wherein said firmware controls comprise:
    a) means to detect a configuration of components to be cooled; and
    b) means to set a cooling fan's lowest speed in response to a detected configuration.

4. A cooling fan speed controller comprising a EEPROM coupled with firmware controls, wherein the EEPROM stores a configuration based fan speed table, and the configuration based fan speed table comprises:
    a) fan speeds; and
    b) fan speed transition points.

5. A cooling fan speed controller as in claim 4, wherein the firmware controls comprise a configuration detecting routine.

6. A cooling fan speed controller as in claim 4, further comprising a fan control register coupled to said firmware controls.

7. A cooling fan speed controller as in claims 6, wherein the fan control register is interconnected with a hardware clamp for insuring that the fan control register drives at least one cooling fan at a speed equal to or greater than a lowest fan speed setting.

8. A cooling fan speed controller as in claim 6, further comprising a first summer, said first summer having a plurality of inputs derived from said fan control register.

9. A cooling fan speed controller as in claim 8, further comprising a first additional summer, said first additional summer having a thermal sense line input and an input derived from said first summer.

10. A cooling fan speed controller as in claim 9, further comprising:
    a) a second fan control register coupled to said firmware controls;
    b) a second summer, said second summer having a plurality of inputs derived from said second fan control register; and c) a second additional summer, said second additional summer having a thermal sense line input and an input derived from said second summer.

11. A method of manufacturing microprocessor controlled devices having a cooling fan associated therewith, the method comprising the steps of:
   a) mounting a cooling fan in a microprocessor controlled device;
   b) connecting the cooling fan to firmware controls for setting the cooling fan's lowest speed; and
   c) writing a configuration based fan speed table into a EEPROM which is accessible to said firmware controls both during and after boot of the microprocessor controlled device.

12. A method as in claim 11, wherein the step of writing a configuration based fan speed table into a EEPROM comprises the steps of:
   a) writing fan speeds into the EEPROM; and
   b) writing fan speed transition points into the EEPROM.

13. A method as in claim 11, further comprising the steps of:
   a) connecting the cooling fan to hardware controls; and
   b) connecting the hardware controls to a thermal sense line.

14. A method as in claim 13, further comprising the step of connecting the thermal sense line to an ambient air temperature sensor.

* * * * *